Jan. 2, 1962 N. C. DE TROYE 3,015,808
MATRIX-MEMORY ARRANGEMENT
Filed Dec. 31, 1958
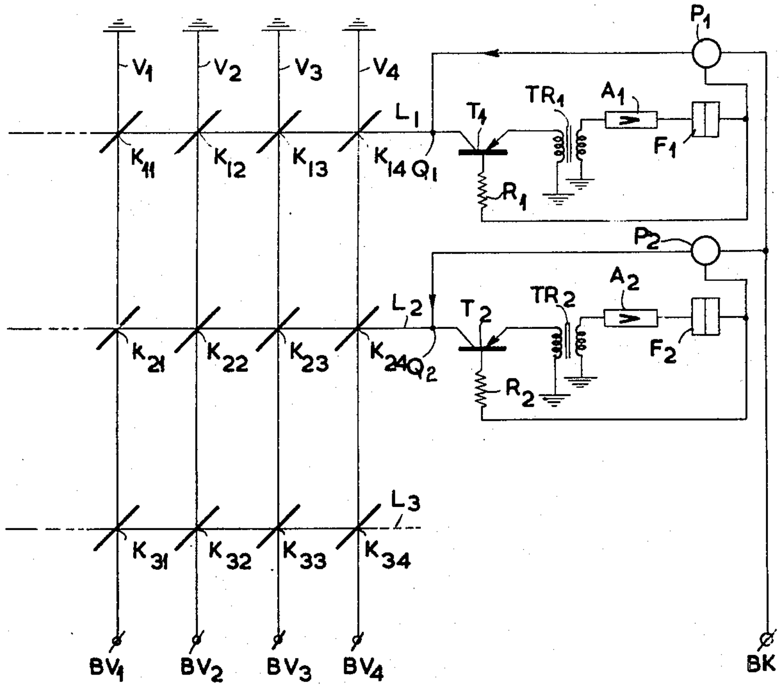
INVENTOR
NICOLAAS CORNELIS DE TROYE
BY Frank R. Zifani
AGENT 3,015,808
Patented Jan. 2, 1962

3,015,808

MATRIX-MEMORY ARRANGEMENT

Nicolaas Cornelis de Troye, Eindhoven, Netherlands, assignor to North American Philips Company Inc., New York, N.Y., a corporation of Delaware Filed Dec. 31, 1958, Ser. No. 784,290
Claims priority, application Netherlands Jan. 7, 1958
4 Claims. (Cl. 340—174)

The present invention relates to matrix-memory arrangements comprising a number of groups of memory elements composed of magnetic material having a rectangular hysteresis loop and a high degree of remanence, the elements being coupled in groups to the same group conductor, while corresponding elements of the several groups are coupled to a common reading conductor which is connected to a bistable trigger circuit through a reading amplifier.

For reading out the information from a given group of memory elements a pulse is supplied to the group conductor concerned so that the memory elements, in which the digit 1 has been recorded, pass over to the condition 0 while supplying an output pulse to the associated reading conductor; the output pulse is amplified by the reading amplifier and brings the trigger circuit into a condition characteristic of the digit 1. After this pulse, all the elements of the group concerned are consequently in the condition 0 and the information has been passed over from this group to the trigger circuits.

In a given device of this type, sometimes termed "Cambridge" memory, the information is subsequently read back into the relevant group of memory elements. For this purpose, after the first pulse, a second pulse of opposite polarity is supplied to the group conductor concerned and also a pulse is supplied to a gate circuit controlled by the trigger circuit; the output of the gate circuit is connected to the associated reading conductor. If the trigger circuit is in the condition 1, the gate circuit passes the pulse so that the memory element coupled to the associated reading conductor is passed over to the condition 1 by the joint action of the pulses through the group conductor and the reading conductor. If the trigger circuit is not in the condition 1, the gate circuit does not pass the pulse and the associated memory elements, which do not receive a pulse through the reading conductor, remain in the condition 0. In known devices, the total duration required for reading out and reading back the information is considerable, that is approximately 10 $\mu$sec.

In accordance with the invention, the speed of operating such a matrix-memory arrangement can be greatly increased by connecting between the reading conductors and the reading amplifiers a second gate circuit which is cut off during the second pulse, that is during reading back the information. It has been found that the duration of a read-out period can be reduced to less than 3 $\mu$sec. by this expedient.

The single FIGURE of the drawing shows the matrix memory arrangement.

In order that the invention may be readily carried into effect, an example will now be described in detail with reference to the drawing.

The memory circuit comprises a number of cores K11, K12, K21, K22 and so on, each of which is composed of magnetic material having a rectangular hysteresis loop and a high degree of remanence; ferrite is an example of such a material. As is known these cores may have two different remanence conditions for recording the binary digits 1 and 0. The cores are arranged in rows and columns according to a matrix. The cores of one column constitute a group in which an associated quantity of information, which is sometimes termed a "word," can be recorded. These cores are coupled to one and the same vertical group conductor V1, V2 and so on. The number of such groups may, for example, be 1024, while the number of cores per group may, for example, be 40. The corresponding cores of the several groups are coupled to one and the same reading conductor L1, L2 and so on, which reading conductors are coupled to a bistable trigger circuit arrangement F1, F2 through a transistor T1, T2, a transformer TR1, TR2 and a reading amplifier A1, A2 which may be transistorized. The trigger circuits F1, F2 each control a gate circuit P1, P2 so that the gate circuits are cut off if the associated trigger circuit is in the condition 0.

The operation of the circuit arrangement is as follows. Assume that information has been recorded in the memory; the manner of recordation is not further described since it is known per se. If the information has to be read out of a given group, for example K11, K21, K31, a strong pulse is supplied by means not further indicated to the group conductor V1 through the terminal BV1, with the result that the cores in the condition 1 pass over to the condition 0 and deliver a reaction pulse to the associated reading conductors L1, L2 and so on, the magnitude of the reaction pulse being approximately 100 mv. These pulses are transmitted, through transistors T1, T2, which are provisionally left out of consideration, transformers TR1, TR2 and reading amplifiers A1, A2, to the bistable trigger circuits F1 and F2 which are initially in condition 0 and are thus caused to assume the condition 1. The remaining cores of the group concerned do not deliver a reaction pulse, so that the associated trigger circuits remain in the condition 0 after the read-out pulse. Hence, the information has disappeared from the relevant group of memory elements and has been taken over by the trigger circuits. In order that the information not be lost, after bringing the trigger circuit back again into the zero condition for reading out a next following piece of information, this information is, in the conventional device, recorded back again into the relevant group of memory cores instantly after reading out. For this purpose immediately after the first pulse a second pulse of opposite polarity is supplied to the group conductor V1 and, moreover, a pulse is supplied to the control terminal BK, which pulse is passed through the gate circuits P1, P2 and so on and then to the reading conductors L1, L2 and so on if the associated trigger circuit F1, F2 is in the condition 1. The intensity of the second pulses applied to the group conductors and the pulses supplied to terminal BK is slightly lower than that corresponding to the coercive force of the magnetic material so that the cores receiving a pulse both through the group conductor V1 and through the associated reading conductor pass over to the condition 1, while the cores receiving a pulse only through the group conductor remain in the condition 0.

The following phenomena occur. For back-recording the information the gates P1, P2 have to supply a current pulse of approximately 0.5 amp. to the reading conductors. Since the reading conductors are coupled to a considerable number of magnetic cores, the inductance of the reading conductors is comparatively high. At the start of this current pulse, a voltage pulse of a few volts is thus produced at the points Q1 and Q2, and at the end of the current pulse decay occurs which again results in the occurrence of voltage pulses at these points; the time integral of the second pulses is the same of that of the first pulses but of opposite polarity. The duration of this decay phenomenon depends upon the size of the load resistor of the reading conductors which, in the absence of the transistors, would be constituted by the input impedance of the reading amplifiers. If this resistance is low, the voltage pulses have a comparatively low amplitude but are of considerable duration, so that the total read-out and record-back period is comparatively long, for example 10 μ/sec. If however, the resistance is high, the duration of the voltage pulses is short but their amplitude is high due to which the reading amplifiers are overdriven and a comparatively long recovery period is necessary to permit reading-out again.

These disadvantages are not obviated by supplying the record-back pulse to a separate control wire not connected to the reading amplifier, because this control wire would extend through all the cores parallel to the reading conductor and so be closely coupled to it, with the result that a considerable voltage would nevertheless be induced into the reading conductor.

In the device according to the invention, gate circuits are connected between the reading conductors L1, L2 and the transformers TR1, TR2, which gate circuits, in the example illustrated in the drawing, comprise transistors T1, T2 and so on, the emitters of which are connected to the transformers, and the collectors to the reading conductors, while the base-electrodes are connected to the trigger circuits F1, F2 through resistors R1, R2; the transistor and trigger polarities are chosen such that the two blocking layers of the transistors are conductive if the associated trigger circuits are in the condition 0; on the other hand, the transistors are cut off if the trigger circuits are in the condition 1. The pulses supplied through the reading conductors L1, L2 on reading out information will consequently be transmitted by the transistors, but the record-back pulses supplied to points Q1, Q2 through the gate circuits P1, P2 can not be transmitted to the reading amplifiers, since the associated transistors are then cut off. The transformers TR1 and TR2 step up the read-out pulses with regard to the reading amplifiers so that, conversely, the input resistance of the reading amplifiers, viewed from the direction of the transistors, is stepped down. The input resistance of the transformers TR1, TR2 consequently amounts to a few ohms only. The value of the resistors R1, R2 is, for example, 10,000 ohms. In the conductive condition of the transistors T1, T2, the voltage of the base electrode is, for example, +1 v., in the cut-off condition −10 v. Consequently, cutting off the transistors requires a voltage variation of approximately 11 v., but only a small fraction thereof is set up across the input terminals of the transformers TR1, TR2, since this voltage is divided in the ratio of the value of the input impedance of these transformers to the value of the resistors R1, R2. The switching voltages set up through the transformers are consequently low with regard to the read-out pulses and are consequently unable to overdrive the reading amplifiers or cause the trigger circuits to pass over to another condition. Since the input resistance of the transistors is high in the cut-off condition, only a short decay phenomenon will occur at Q1, Q2 on back-recording the information. Though the amplitude is high the reading amplifiers are not affected.

It has been found that this expedient permits the time between recording back and reading out the information to be reduced to approximately 0.12 μ/sec. Instead of using transistors it is alternatively possible to use separated rectifiers to constitute the gate circuit. A disadvantage is that the internal resistance of existing rectifiers considerably exceeds that of transistors and that for obtaining a comparatively low internal resistance a comparatively high bias current would have to be sent through the rectifiers, for example 10 ma. If desired, the gate circuits may alternatively be controlled by separate pulse sources instead of being controlled by the trigger circuits.

What is claimed is:

1. A matrix-memory circuit arrangement comprising a plurality of groups of memory elements, said elements being composed of magnetic material having a rectangular hysteresis loop and a high remanence, each of said groups being coupled together to one group conductor with corresponding elements of the groups being coupled together to one reading conductor and to a bistable trigger circuit, means for applying a first pulse to one of said group conductors for reading-out information stored in one group, and means for subsequently applying a second pulse of opposite polarity to said group conductor for back-recording said information, means for applying a third pulse concurrent with said second pulse to the associated reading conductor through a gate circuit, said gate circuit being controlled by said bistable trigger circuit, and isolating means connected in each reading conductor at a point between the memory elements and the associated bistable trigger circuit for isolating said memory elements from the remainder of the reading circuit during the time interval of said second and third pulses, said isolating means comprising a second gate circuit which is cut-off during said time interval and conductive at other times.

2. A matrix-memory circuit arrangement as recited in claim 1, wherein the conduction of said second gate circuit is controlled by the associated bistable trigger circuit.

3. A matrix-memory circuit arrangement as recited in claim 1, wherein said second gate circuit comprises a transistor, the emitter-collector circuit of said transistor being connected in series with the reading conductor, the base of said transistor being coupled to said bistable trigger circuit.

4. The circuit arrangement of claim 3, said base being coupled to said trigger circuit through a resistor.

References Cited in the file of this patent

UNITED STATES PATENTS

| | | |
|---|---|---|
| 2,750,580 | Rabenda et al. | June 12, 1956 |
| 2,784,391 | Rajchman et al. | Mar. 5, 1957 |